Patented June 22, 1954

2,681,889

UNITED STATES PATENT OFFICE 2,681,889

EMULSIFIED ACIDS FOR WELL TREATING

Paul L. Menaul and Harold W. Gray, Jr., Tulsa, Okla., assignors to Stanolind Oil and Gas Company, Tulsa, Okla., a corporation of Delaware No Drawing. Application December 29, 1951, Serial No. 264,282

12 Claims. (Cl. 252—8.55)

This invention relates to the art of acidizing wells. More particularly, it relates to the use of an emulsion of acid in oil to acidize wells, the oil serving to delay the reaction of the acid with the formation.

The use of delayed-action acids in acidizing formations penetrated by wells has been previously proposed. These acids may be only slightly ionized, such as for example, various of the organic acids; they may be viscous, such as gum-gelled acids, or they may be emulsified. Of the emulsified acids, the acid-in-oil type has been found to be most desirable since the formation is more effectively protected from the acid, and greater penetration of the unreacted acid into the formation is assured, if the oil is the external, continuous phase. In prior art emulsions of this type, the emulsion is stabilized, by the use of an emulsifier, to a degree sufficient to prevent breakdown of the emulsion when it is forced through the formation pores. The emulsion is broken, and the acid liberated for ready reaction with the formation, by the action of a dormant, or delayed-action demulsifier. The system is operable, but it will be apparent that the emulsifier and demulsifier must be very carefully balanced to prevent plugging of the formation with a permanent emulsion or premature breaking of the emulsion before injection into the formation.

Preferably, the reaction of the acid with the formation should be delayed for a length of time sufficient to permit all the acid to be injected back into the formation before any substantial amount of reaction with the formation occurs. Then, if desired, the acid can be permitted to flow slowly out of the formation as it reacts. Thus, the silt which is always liberated in acidizing operation, will flow out of the formation into the well rather than being forced back into the formation as in the usual acidizing job. If bridging of the silt occurs in the pores or crevices of the formation, active acid is present to dissolve away the walls of the pores or crevices and release the silt so it can continue its flow toward the well.

An object of this invention is to provide an improved delayed-action acidizing composition for treating wells.

Another object of this invention is to provide a novel method of acidizing a well in which an emulsion of acid in oil is injected into the formation, the oil serving to delay the reaction of the acid with the formation until the acid has penetrated a considerable distance into the formation.

Still another object of this invention is to provide a method for treating a well in which a delayed-action acid-in-oil emulsion is employed which breaks automatically after a short period of time without the aid of a demulsifier.

An additional object of this invention is to prepare an emulsified acid in which the emulsion is sufficiently stable to resist breaking when forced through capillary pores, and to prevent substantial reaction of the acid with the formation until the acid has been entirely displaced into the formation.

In general, I accomplish the objects of my invention by employing as an emulsifier, an oil-soluble, substantially non-ionic, surface-active agent containing an ester linkage which is hydrolyzed by the action of the acid to break the emulsion and release the acid for ready reaction with the formation at a considerable distance from the well bore.

The emulsifier should be oil soluble with only sufficient polar groups to render it slightly hydrophilic to insure the formation of an acid-in-oil type emulsion. The emulsifier should also be substantially non-ionic. Some of the ionic, surface-active agents are destroyed by acids, but the reactions, being ionic, take place almost instantaneously, causing these ionic materials to be unsuitable for use in the proposed process. The non-ionic, surface-active agents, on the other hand, are unaffected by the acid or by formation brines except for the relatively slow hydrolytic effect of the acid on ester linkages in the emulsifiers.

The term "oil-soluble" is somewhat misleading in that many satisfactory emulsifying agents are really oil-dispersible rather than truly oil-soluble. The term "oil-soluble" is used in the broader sense hereinafter to include agents sufficiently oil-dispersible to produce a relatively permanent dispersion or suspension of about 5 per cent by weight in the oil phase of the emulsion.

The term "non-ionic" is also a somewhat indefinite term as applied to emulsifiers. For the purposes of this invention, the term should be interpreted to mean those emulsifiers which are substantially unaffected by acids, bases, or brines except for hydrolysis of the ester linkage.

Since the emulsion is an acid-in-oil type, the acid contacts the formation only where it can break through the surrounding oil film. This action does take place to a certain, limited extent, but the reaction of the acid with the formation occurs readily and rapidly only when the emulsion breaks due to hydrolysis of the surface-active agent by the action of the acid. Inasmuch as rapid reaction of the acid with the formation occurs only after the emulsion breaks, there is little if any danger that the acid will all react with the formation before it has had a chance to hydrolyze the emulsifier. Thus, the emulsion cannot remain stable and plug the formation.

Specific examples of emulsifiers suitable for use in our process are polyoxyethylene sorbitol esters of cottonseed oil acids, anhydrosorbitol monooleate, and phosphatides, such as the lecithins and cephalins. The first two materials can be obtained commercially at present as Atlas G-931 and Span 80, respectively. Lecithin is commercially available from several sources, but usually is contaminated with cephalin and other phosphatides. In general, these compounds are classified as esters of polyhydric alcohols.

Polyhydric alcohols, from which such esters can be formed include glycols; polyethylene glycols; glycerol; tetrahydric alcohols, such as erythritol; pentahydric alcohols, such as arabitol and xylitol; hexahydric alcohols, such as sorbitol and mannitol and polyhydric alcohols containing more than six hydroxy groups. The class of suitable alcohols also includes the anhydro derivatives in which water has been removed from two hydroxyl groups to form a cyclic ether of the polyhydric alcohol. These anhydro derivatives can be formed from polyhydric alcohols containing a chain of at least four carbon atoms. Another group of suitable polyhydric alcohols comprises the monosaccharides; such as sorbose, mannose, glucose, arabinose, xylose, erythrose and glyceraldehyde, although the last two frequently are not referred to as monosaccharides. Other polyhydric alcohols, such as pentaerythritol may also be esterified to produce emulsifying agents suitable for my purposes.

Esterification of one hydroxyl group with a fatty acid containing at least twelve carbon atoms is usually sufficient to impart enough oil solubility to cause formation of an acid-in-oil emulsion, although esterification of at least two hydroxyl groups is usually advisable. Acids such as lauric, oleic, stearic or palmitic may be used for this purpose. In the case of the hexahydric and pentahydric alcohols, the unesterified hydroxyl groups lend sufficient water solubility to insure formation of stable emulsions. Increase in water solubility may be achieved in the case of the higher molecular weight polyhydric alcohols by dehydration to form cyclic ethers containing five or six atoms in the ring. In some cases other polar groups such as, for example, the phosphorous or nitrogen groups in lecithin, may impart sufficient water solubility for the purposes of this invention.

The hexahydric alcohol, sorbitol, is particularly desirable as a polyhydric alcohol since it has sufficient hydroxyl groups to insure water solubility even though up to three or four of such groups are esterified to lend oil solubility, and even though two of the groups are eliminated to form a cyclic ether. In practice, the sorbitol and anhydrosorbitol esters have been found to be particularly effective emulsion stabilizers for use in the process of this invention.

If the resulting ester is not sufficiently polar, a polyoxyethylene chain may be attached through an ether linkage with one of the remaining hydroxyl groups to impart greater hydrophilic properties. The hydrophilic properties can be adjusted by varying either the number or the length of the polyoxyethylene chains. In general, one or more chains containing a total in all chains of about 4 oxyethylene groups will impart sufficient water solubility even when three or four of the hydroxyl groups have been esterified. Addition of more than 4 oxyethylene groups is undesirable because the water solubility becomes too great, resulting in a tendency of the emulsion to invert. It will be apparent that other polyoxyalkylene chains, such as polyoxypropylene, can also be employed.

When the terms "polyoxyethylene," "polyoxypropylene" or "polyoxyalkylene" are employed in chemical names such as polyoxyethylene sorbitol ester of cottonseed oil acids, it will be understood that the terms indicate that the chemicals contain not more than four polyoxyalkylene groups per molecule, although these groups may be present in one or more chains.

The oil-soluble, non-ionic, ester-linkage-containing, surface-active agent can be effectively employed in concentrations of about 0.5 to 5.0 per cent by weight of the oil phase. Use of less than 0.5 per cent of the emulsifier results in a rather unstable emulsion, although some instability can be tolerated since the acid needs to remain emulsified only long enough to be injected into the formation. Care must be taken, however, to avoid breaking of the emulsion when flowing through the pores of the formation. Thus, the use of at least 1 or 2 per cent emulsifier is generally preferred.

Use of more than 5 per cent emulsifier is not advisable in most cases since the hydrolysis of the emulsifying ester is an equilibrium reaction, and enough of the unhydrolyzed emulsifier might remain to form a fairly stable emulsion. The equilibrium on hydrolysis of an ester is normally reached when about 34 per cent of the ester has been hydrolyzed, leaving 66 per cent unchanged ester. This equilibrium can, of course, be shifted by removal of one or more of the products of hydrolysis. When the esters of the polyhydric alcohols are hydrolyzed, a water-soluble alcohol and a water-insoluble fatty acid are formed. These products pass into the separate phases of the water-in-oil emulsion causing the hydrolysis to proceed nearly to completion. Still, as much as 5 per cent of the original quantity of ester may remain unchanged in some cases, so it is generally advisable to use not more than 3 or 4 per cent of the emulsifier, by weight of oil, to avoid the possibility of forming a fairly stable emulsion even after hydrolysis of the emulsifier.

A refined petroleum fraction such as kerosene, stove oil, diesel fuel, or the like, is preferred for preparing the emulsion. The use of such a refined petroleum fraction avoids any possible difficulty with natural emulsifiers present in crude oils. However, the type of oil is not critical, and most crude oils generally can be successfully employed as the oil phase.

When the term "oil" is employed, a liquid hydrocarbon oil such as those named above, or benzene, is intended.

In order to obtain an emulsion in oil, the acid is dissolved in water. For this reason, the acid must be water-soluble. The preferred solution is the 15 per cent HCl solution in water commonly employed in acidizing. A concentration as high as 25 weight per cent of HCl can be employed before encountering difficulties due to high concentrations of the products of acidizing. As little as 5 per cent HCl may be employed in acid-wash operations. Other halogen acids may also be employed in about the same concentration range. Hydrogen fluoride is particularly advantageous for treating sandy limestones, or even sandstone formations themselves. Other mineral acids, such as nitric, sulfuric, or phosphoric may also be employed, with due precaution being taken against the formation of insoluble products by the reaction of the acids with formation brines or with the formations themselves.

It will be noted that hydrochloric acid is a very strong acid. That is, its aqueous solutions contain a high concentration of hydrogen ions. Such an acid produces rather rapid hydrolysis of the ester-linkage emulsifying agent sometimes causing the emulsion to break in less than an hour, depending on factors such as character of emulsifying agents, viscosity of emulsion, concentration of acid and the like. If a slower hydrolysis rate is desired, a weaker acid, such as hydrobromic, or phosphoric may be employed. If very slow hydrolysis rates are desired, requiring on the order of 50 hours for breaking of the emulsion, the organic acids, such as acetic or propionic may be employed for acidizing. Intermediate hydrolysis rates between the strong mineral acids and the weak organic acids can also be achieved by use of modified organic acids, such as the chloroacetic acids, as the acidizing materials. In the case of the weaker acids, concentrations slightly in excess of the 25 per cent upper limit suggested for HCl may be advisable. Concentrations up to 40 per cent may be desirable in some cases for weak acids, such as acetic. When the term "water-soluble acids" is used hereinafter, an acid is intended having a water solubility high enough to produce the desired acid concentration. Thus, for simple acid-washing operations in which an acid concentration of only about 5 or 10 per cent is desired, a solubility of 5 to 10 per cent is sufficient and the acid is to be classed as "water-soluble" for purposes of this invention.

Since the aqueous acid solution is the active ingredient of the emulsion, it is generally desirable to employ as high an acid-to-oil ratio as possible. For example, a ratio of 10 parts by volume of aqueous 15 per cent HCl solution to 1 part by volume of diesel fuel has been successfully mixed and handled when stabilized by slightly less than 5 per cent by weight (based on the diesel fuel) of polyoxyethylene sorbitol esters of cottonseed oil acids (Atlas G–931). The emulsion had a very high apparent viscosity, but it was successfully pumped, apparently due to the presence of the oil film which lubricated flow of the emulsion. Use of acid-to-oil ratios above 20 to 1 are not considered advisable both because of the high resulting viscosity and because of the thinness of the oil film around the acid droplets in such cases. This thin oil film is rather easily broken through by the acid in flowing through the pores of the formation, so is not as effective as might be desirable in delaying the rate of reaction of the acid with the formation. An acid-to-oil ratio or less than 1 to 1 usually is not employed simply because such an emulsion contains too little of the active aqueous acid ingredient. A ratio of about 5 or 6 parts of aqueous acid solution to 1 part of oil is normally found to be the most desirable for delayed action acidizing. If fracturing of the formation is contemplated, higher acid-to-oil ratios, in the range of 10 to 1, are more advantageous since higher viscosities are attained by use of larger proportions of the dispersed phase.

The following examples of preferred embodiments of my invention will further aid in understanding the invention.

Example I

One-half ml. of polyoxyethylene sorbitol tetraoleate (Atlas G–2854) was dissolved in 8½ ml. of diesel fuel. One hundred ml. of 15 per cent HCl was slowly poured into the diesel fuel solution of the emulsifying agent while the mixture was agitated by a mechanical mixer. A thick-appearing white emulsion resulted. The emulsion was stirred slowly at 140° F. for twenty minutes to simulate pumping to the bottom of a 6000 ft. well. The emulsion was then squeezed through a six-inch section of one-inch pipe packed with Ottawa sand. The flow rate through the sand in the nipple at a 100 p. s. i. differential across the section was measured and the effective viscosity was calculated from the previously calibrated permeability of the sand-packed nipple. This effective viscosity was 374 centipoises. The emulsion first began to show signs of breaking as it was forced through the sand in the nipple, thirty minutes after it was prepared. But the viscosity even at that time was ample to fracture many formations, if desired.

Example II

A batch of emulsified acid was made up according to this invention employing field equipment. In this case, a mixture of polyoxyethylene sorbitol esters of cottonseed oil acids (Atlas G–931) was employed as the emulsifier. Two and one-half gallons of the emulsifier were poured into a tank with fifty gallons of diesel fuel. Fifty gallons of a 15 per cent solution of HCl in water were poured in and the mixture was circulated through a pump for two minutes to form a primary emulsion. During this circulation, the pump took suction from the tank and pumped the mixture through a nozzle to form a horizontal stream which impinged upon a plate set at an angle to deflect the stream back down into the tank. At the end of two minutes circulation, the primary emulsion was well mixed. The remaining 450 gallons of acid was then allowed to flow slowly, during a period of ten minutes, into the intake of the pump together with the circulated emulsion. The pump forced the mixture through the nozzle, against the impinging plate, and into the tank. After the remaining acid had been mixed into the primary emulsion, circulation was continued for two minutes to complete preparation of the emulsion made up of 500 gallons of acid, 50 gallons of diesel fuel, and 2½ gallons of the emulsion stabilizing agent. At the end of two hours at 80° F., a sample of this emulsion was still stable. At the end of four hours, the emulsion was beginning to break and at the end of eight hours, the sample had virtually completely separated into an oil phase and an aqueous phase.

Example III

A diesel fuel solution of polyoxyethylene sorbitol tetraoleate (Atlas G–2854) was prepared containing 4 per cent by weight of the emulsifier. To 10 parts by volume of this oil solution were added 10 parts by volume of an aqueous HCl solution containing 15 per cent by weight of the acid. A primary emulsion was formed by mechanical mixing of these phases. To the primary emulsion, an additional 80 parts by volume of the acid solution were added slowly during agitation to form a final emulsion. The emulsion showed a complete break to oil phase and water phase as follows:

Temperature: Time of break
80° F _____ 6-10 hours.
140° F _____ 45-60 minutes.

A portion of the emulsion was forced into a lucite cylinder filled with limestone fragments and held at 1000 p. s. i. and room temperature. At 2 hours, the emulsion showed signs of breaking. At 4 hours, demulsification was complete and the acid was reacting on the limestone.

A portion of the emulsion was forced into a 0.5 mm. capillary glass tube 3 feet long and the ends sealed. Flow of the emulsion through the capillary did not cause the emulsion to break, but in twelve hours the emulsion had completely broken even though confined in the capillary.

*Example IV*

Emulsions were prepared by the procedure of Example III but employing acids of various strengths. The times of breakdown of these emulsions were as follows:

Acid: Time of break, 80° F.
15% HCl _____ 6-10 hours.
7.5% HCl _____ 20 hours.
15% HF _____ 24 hours.
30% acetic acid _____ 50 hours.

In all cases, efforts were made to re-emulsify the separated oil and water phases. The phases refused to re-emulsify in every case. It will be apparent that the breaking time of the emulsion can be easily predetermined by selection of an acid of the proper strength.

*Example V*

An emulsion was prepared according to the procedure of Example III employing anhydrosorbitol monooleate (Span 80) as the emulsifier. The emulsion had substantially the same properties as the emulsion of Example III.

Although specific examples and theories have been described, we do not wish to be limited by these examples and theories. The scope of the invention is, rather to be limited only by the claims.

We claim:

1. An acid-in-oil emulsion suitable for well acidizing stabilized by an oil-soluble, non-ionic, surface-active agent having an ester linkage hydrolyzable by the action of the acid to break the emulsion.

2. A delayed-action acid for acidizing wells comprising a water-in-oil emulsion of 1 to 20 parts by volume of an aqueous solution, containing 5 to 25 per cent by weight of a water-soluble acid, in one part by volume of an oil, containing 0.5 to 5.0 per cent by weight of an oil-soluble, non-ionic, surface-active agent having an ester linkage hydrolyzable by the action of the acid to cause the emulsion to break.

3. A method of delaying the action of an aqueous well-acidizing solution comprising forming an emulsion of said solution in an oil, and stabilizing the emulsion with an oil-soluble, non-ionic, surface-active agent having an ester linkage hydrolyzable by the action of the acid to break the emulsion.

4. A process for treating wells comprising injecting into a formation penetrated by said well an acid-in-oil emulsion stabilized by an oil-soluble, non-ionic, surface-active agent having an ester linkage hydrolyzable by the action of the acid to break the emulsion.

5. In the process of treating wells in which an acid-in-oil emulsion is injected into a formation penetrated by a well, the improvement comprising stabilizing said emulsion by the addition of an oil-soluble, non-ionic, surface-active agent having an ester linkage hydrolyzable by the action of the acid to break the emulsion.

6. A process for treating wells comprising injecting into a formation penetrated by a well, a water-in-oil emulsion of 1 to 20 parts by volume of an aqueous solution, containing from 5 to 25 per cent by weight of a water soluble acid, in 1 part by volume of oil containing from 0.5 to 5.0 per cent by weight of an oil-soluble, non-ionic, surface-active agent having an ester linkage hydrolyzable by the action of said acid to destroy the surface-active agent and thus break the emulsion.

7. The process of claim 6 in which said water-soluble acid is selected from the group consisting of HCl, HF, HBr, chloroacetic acid, and acetic acid, and in which said oil-soluble, non-ionic, surface-active agent is an ester of a polyhydric alcohol and a fatty acid, said fatty acid having at least twelve carbon atoms in the molecule.

8. The process of claim 7 in which said polyhydric alcohol is selected from the group consisting of sorbitol and anhydrosorbitol.

9. A process for acidizing a well comprising injecting into a formation penetrated by said well, a water-in-oil emulsion of about 10 parts by volume of an aqueous solution containing about 15 per cent by weight of HCl in one part by volume of a refined petroleum fraction containing about 3 parts by weight of polyoxyethylene sorbitol tetraoleate.

10. The method of claim 3 in which the acid is a water-soluble acid weaker than HCl whereby the action of the acid is further delayed due to the slower rate of hydrolysis of the surface-active agent in the presence of the weaker acid.

11. A new composition of matter comprising a water-in-oil emulsion containing from 1 to 20 parts by volume of an aqueous mixture, comprising from about 5 to about 25 weight per cent of a water-soluble acid, in 1 part by volume of a refined petroleum fraction containing from about 0.5 to about 5.0 weight per cent of an oil-soluble, non-ionic, surface-active agent consisting of an ester of a polyhydric alcohol having from 3 to 6 carbon atoms and a hydroxyl group attached to each carbon atom wherein up to two of said hydroxyl groups are esterified with a fatty acid having at least 12 carbon atoms and wherein not more than one of said groups is attached to a polyoxyalkylene chain having from two to four oxyalkylene groups in said chain.

12. The composition of claim 11 in which the non-ionic, surface-active agent is present in a concentration of from about 1 to about 2 weight per cent.

References Cited in the file of this patent

UNITED STATES PATENTS

| Number | Name | Date |
|---|---|---|
| 1,922,154 | De Groote | Aug. 15, 1933 |
| 2,050,932 | De Groote | Aug. 11, 1936 |
| 2,050,933 | De Groote | Aug. 11, 1936 |
| 2,175,079 | Dow | Oct. 3, 1939 |
| 2,356,205 | Blair et al. | Aug. 22, 1944 |
| 2,356,254 | Lehmann et al. | Aug. 22, 1944 |